(12) United States Patent
Sen et al.

(10) Patent No.: US 10,480,322 B2
(45) Date of Patent: Nov. 19, 2019

(54) TURBINE ENGINE WITH ANNULAR CAVITY

(71) Applicant: GENERAL ELECTRIC COMPANY, Schenectady, NY (US)

(72) Inventors: Arnab Sen, Bangalore (IN); Jeffrey Douglas Rambo, Mason, OH (US); Rajesh Kumar, Bangalore (IN); Bhaskar Nanda Mondal, Bangalore (IN); Alan Roy Stuart, Cincinatti, OH (US); Robert Proctor, Mason, OH (US); Christopher Charles Glynn, Clearwater Beach, FL (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 15/870,313

(22) Filed: Jan. 12, 2018

(65) Prior Publication Data
US 2019/0218913 A1    Jul. 18, 2019

(51) Int. Cl.
| F01D 5/08 | (2006.01) |
| F01D 1/24 | (2006.01) |
| F02K 3/072 | (2006.01) |
| F01D 11/00 | (2006.01) |
| F02C 7/18 | (2006.01) |

(52) U.S. Cl.
CPC ............... *F01D 5/084* (2013.01); *F01D 1/24* (2013.01); *F01D 11/00* (2013.01); *F02C 7/18* (2013.01); *F02K 3/072* (2013.01); *F05D 2220/323* (2013.01); *F05D 2240/24* (2013.01); *F05D 2240/55* (2013.01); *F05D 2260/20* (2013.01)

(58) Field of Classification Search
None
See application file for complete search history.

(56) References Cited

U.S. PATENT DOCUMENTS

| 3,363,419 A | 1/1968 | Wilde |
| 5,003,766 A | 4/1991 | Paul |
| 5,211,541 A * | 5/1993 | Fledderjohn ............ F01D 5/066 415/216.1 |
| 5,809,772 A * | 9/1998 | Giffin, III ............... F02K 3/075 60/226.1 |
| 6,684,626 B1 * | 2/2004 | Orlando .................... F01D 5/03 415/65 |
| 6,732,502 B2 | 5/2004 | Seda et al. |
| 6,763,652 B2 | 7/2004 | Baughman et al. |
| 6,763,654 B2 | 7/2004 | Orlando et al. |
| 7,195,446 B2 | 3/2007 | Seda et al. |
| 7,980,054 B2 | 7/2011 | Suciu et al. |
| 8,011,877 B2 * | 9/2011 | Schilling ................... F01D 5/03 415/91 |
| 8,015,798 B2 | 9/2011 | Norris et al. |
| 8,061,968 B2 | 11/2011 | Merry et al. |
| 8,104,257 B2 | 1/2012 | Norris et al. |

(Continued)

*Primary Examiner* — Michael Lebentritt
(74) *Attorney, Agent, or Firm* — McGarry Bair PC

(57) ABSTRACT

An apparatus and method for cooling a portion of a turbine engine comprising an outer casing defining an axial centerline, a turbine section through which a flow of combustion gasses flows in a forward to aft direction, an outer drum located between the outer casing and the turbine section defining an annular cavity therebetween. A set of seals extends between the outer casing and outer drum to define at least one cooled cavity.

30 Claims, 6 Drawing Sheets

(56) References Cited

U.S. PATENT DOCUMENTS

| | | |
|---|---|---|
| 8,191,352 B2 | 6/2012 | Schilling |
| 8,356,469 B1 | 1/2013 | Dale |
| 8,371,127 B2 | 2/2013 | Durocher et al. |
| 8,667,773 B2 | 3/2014 | Silowski |
| 8,726,635 B1 | 5/2014 | Dale |
| 2004/0060279 A1* | 4/2004 | Robert Joseph ........ F01D 1/24 60/226.1 |
| 2004/0086377 A1* | 5/2004 | Proctor .................... F01D 1/26 415/116 |
| 2005/0081509 A1* | 4/2005 | Johnson ................. B64D 33/02 60/226.1 |
| 2006/0272314 A1 | 12/2006 | Moniz et al. |
| 2011/0079019 A1* | 4/2011 | Durocher ............... F01D 5/082 60/796 |
| 2013/0000322 A1* | 1/2013 | Silkowski ............... F01D 7/00 60/792 |
| 2013/0219860 A1* | 8/2013 | Suciu ..................... F02K 3/072 60/268 |
| 2013/0272872 A1* | 10/2013 | Zheng ................... F01D 11/003 415/230 |
| 2016/0123154 A1* | 5/2016 | Manning ................ F01D 5/147 416/90 R |
| 2016/0195010 A1 | 7/2016 | Roberge |
| 2016/0201491 A1* | 7/2016 | Surace ................... F01D 9/065 415/1 |
| 2016/0312640 A1* | 10/2016 | Clouse .................. F01D 11/005 |
| 2017/0002678 A1 | 1/2017 | Subramanian et al. |
| 2017/0022842 A1* | 1/2017 | Spangler ................ F01D 9/042 |
| 2017/0051680 A1* | 2/2017 | Becker, Jr. .............. F01D 5/18 |
| 2017/0314416 A1* | 11/2017 | Sharma ................. F01D 25/12 |
| 2017/0335721 A1* | 11/2017 | Spangler ................ F01D 5/187 |
| 2017/0342851 A1* | 11/2017 | Narasimharao .......... F01D 5/12 |
| 2018/0023415 A1* | 1/2018 | Simms ................... F01D 11/08 415/173.1 |
| 2018/0340468 A1* | 11/2018 | Takamura ................ F02C 6/08 |
| 2019/0078516 A1* | 3/2019 | Sampath ................. F02C 6/08 |
| 2019/0085715 A1* | 3/2019 | van der Merwe ...... F01D 15/10 |

* cited by examiner

TURBINE ENGINE WITH ANNULAR CAVITY

BACKGROUND OF THE INVENTION

Turbine engines, and particularly gas or combustion turbine engines, are rotary engines that extract energy from a flow of combusted gases passing through the engine onto a multitude of rotating turbine blades.

A turbine engine includes but is not limited to, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies.

In at least some turbine engines, at least one turbine rotates in an opposite direction than the other rotating components within the engine. In some implementations a counter-rotating low-pressure turbine includes an outer drum having a first set of stages that are rotatably coupled to the forward fan assembly, and an inner drum having an equal number of stages that is rotatably coupled to the aft fan assembly.

The outer drum can be spaced from an outer casing of the engine and require cooling therebetween.

BRIEF DESCRIPTION OF THE INVENTION

In one aspect, the present disclosure relates to a turbine engine comprising an outer casing having a first surface facing an interior of the outer casing and defining an axial centerline, a turbine section having a set of vanes and a set of blades axially spaced from the set of vanes, both sets circumferentially arranged about the axial centerline, and through which a flow of combustion gasses flows in a forward to aft direction, an outer drum located within the outer casing and having a second surface spaced from the first surface to define an annular cavity between the first and second surfaces, a set of seals extending between the first surface and the second surface to define at least one cooled cavity within the annular cavity, and a set of flow passages provided in the outer drum and fluidly coupling the at least one cooled cavity to the turbine section.

In another aspect, the present disclosure relates to a turbine engine comprising an outer casing having a first surface facing an interior of the outer casing and defining an axial centerline, a turbine section having counter rotatable inner and outer drums each including a set of blades extending therefrom and rotatable about the axial centerline through which a flow of combustion gasses flows in a forward to aft direction, the outer drum defining a second surface spaced from the first surface to define an annular cavity between the first and second surfaces, a set of seals extending between the first surface and the second surface to define at least one cooled cavity within the annular cavity, and a set of flow passages provided in the outer drum and fluidly coupling the at least one cooled cavity to the turbine section.

In yet another aspect, a method for cooling an annular cavity of a turbine engine having an outer casing and an outer drum located within the outer casing and with the annular cavity formed therebetween, the method comprising introducing a cooling fluid into the annular cavity, flowing the cooling fluid through at least one cooled cavity located within the annular cavity, and flowing at least a portion of the cooling fluid through a flow passage in the outer drum.

DETAILED DESCRIPTION OF THE INVENTION

Figure 1:
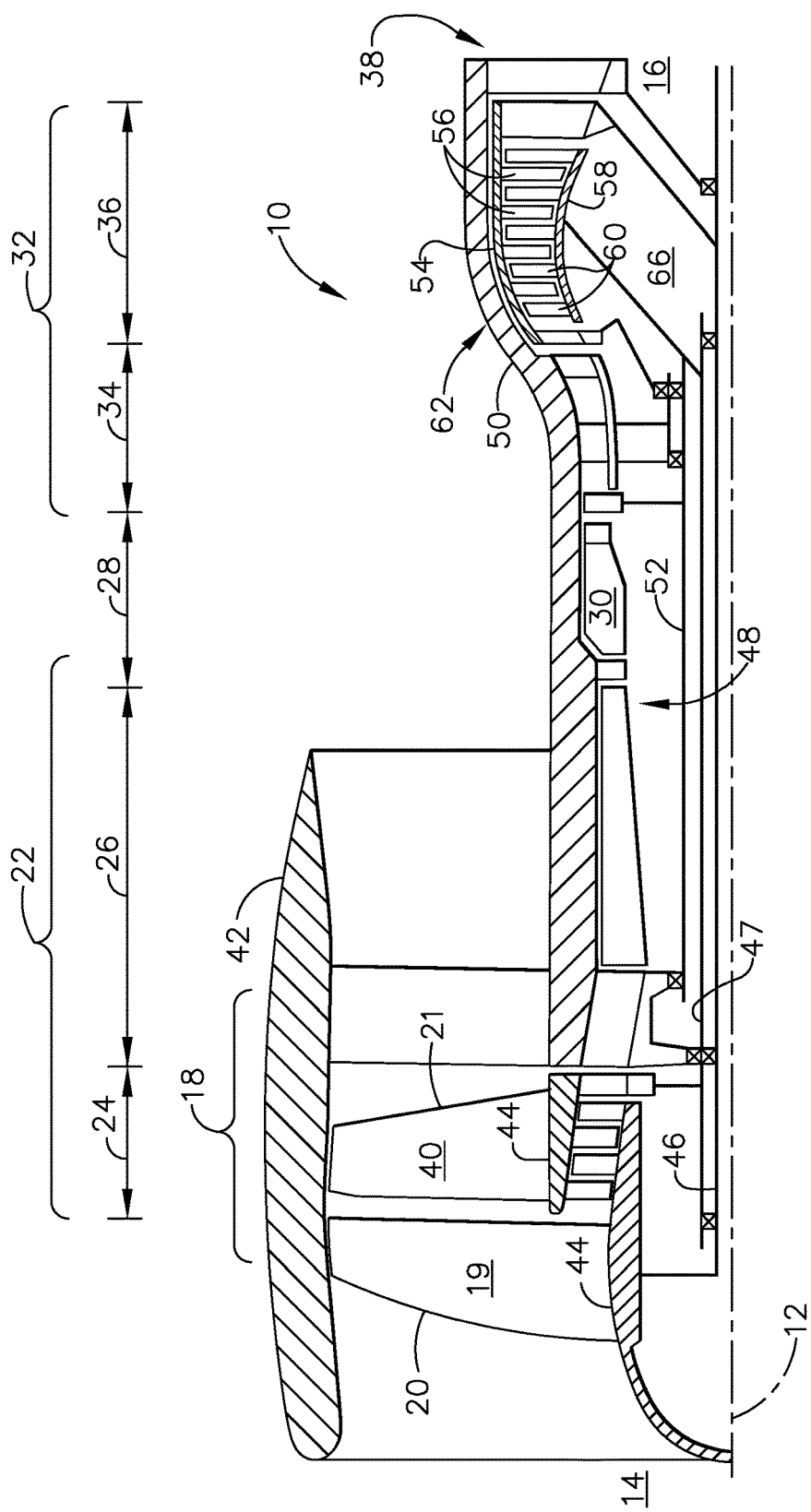
FIG. 1 is a schematic cross-sectional diagram of a turbine engine with a counter rotating low pressure turbine for an aircraft.

Aspects of the disclosure described herein are directed to the cooling of an annular cavity formed between an outer casing of a turbine engine and an outer drum, in one aspect of the disclosure the outer drum is rotatable within the outer casing. Cooling air can be channeled within the annular cavity and through cooling passages and channels formed in portions of the outer drum. For purposes of illustration, the present disclosure will be described with respect to a counter rotating low pressure turbine for an aircraft turbine engine. It will be understood, however, that aspects of the disclosure described herein are not so limited and may have general applicability within an engine, including low pressure turbines with stationary stator components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The turbine engine 10 has a generally longitudinally extending axis or centerline 12 extending forward 14 to aft 16. The engine 10 includes, in downstream serial flow relationship, a fan section 18 including a forward fan assembly 20 and an aft fan assembly 21, a compressor section 22 including a booster or low pressure (LP) compressor 24 and a high pressure (HP) compressor 26, a combustion section 28 including a combustor 30, a turbine section 32 including a HP turbine 34, and a counter-rotating LP turbine 36, and an exhaust section 38.

The fan assemblies 20 and 21 are positioned at a forward end of the turbine engine 10 as illustrated. The terms "forward fan" and "aft fan" are used herein to indicate that one of the fans 20 is coupled axially upstream from the other fan 21. It is also contemplated that the fan assemblies 20, 21 can be positioned at an aft end of turbine engine 10. Fan assemblies 20 and 21 each include a plurality of rows of fan blades 40 positioned within a fan casing 42. Fan blades 40 are joined to respective rotor disks 44 that are rotatably coupled through a respective forward fan shaft 46 to the forward fan assembly 40 and through an aft fan shaft 47 to the aft fan assembly 21.

The HP compressor 26, the combustor 30, and the HP turbine 34 form an engine core 48 of the engine 10. The engine core 48 is surrounded by an outer casing 50 defining an interior 66, which can be coupled with the fan casing 40. The HP turbine 34 is coupled to the HP compressor 26 via a core rotor or shaft 52. In operation, the engine core 48 generates combustion gases that are channeled downstream to the counter-rotating LP turbine 36 which extracts energy from the gases for powering fan assemblies 20, 21 through their respective fan shafts 46, 47.

The counter-rotating LP turbine 36 includes an outer drum 54 positioned radially inward from outer casing 50. The outer drum 54 can have a generally frusto-conical shape and include a first set of blades 56, circumferentially arranged, that extend radially inwardly towards the axial centerline 12. Though discussed with respect to a rotating outer drum 54, it is further contemplated that the first set of blades 56 can be a set of circumferentially arranged static vanes, also known as a nozzle.

The counter-rotating LP turbine 36 further includes an inner drum 58 arranged substantially coaxially with respect to, and radially inward of, outer drum 54. The inner drum 58 includes a second set of blades 60, circumferentially arranged and axially spaced from the first set of blades 56, that extend radially outwardly away from the axial centerline 12. The first and second set of blades 56, 60 define a plurality of turbine stages 62. While illustrated as having five stages, it should be understood that any quantity of stages is contemplated and the stages shown are for illustrative purposes and not meant to be limiting. It should also be understood that while illustrated as a first set of blades 56 forward of the second set of blades 60, the first and second set of blades 56, 60 are not so limited, and can be arranged in any suitable manner wherein the first set of blades 56 is axially aft the second set of blades 60.

While illustrated as having a counter-rotating LP turbine 36, it should be understood that aspects of the disclosure discussed herein can be applied to turbine engines without counter-rotating LP turbines. Turbine engines having LP turbines in which static circumferentially arranged vanes are axially spaced from rotating circumferentially arranged blades are also contemplated. Furthermore, a turbine engine having a counter-rotating compressor section 22, in particular either a counter-rotating LP compressor 24 or a counter-rotating HP compressor 26 is also contemplated.

Figure 2:
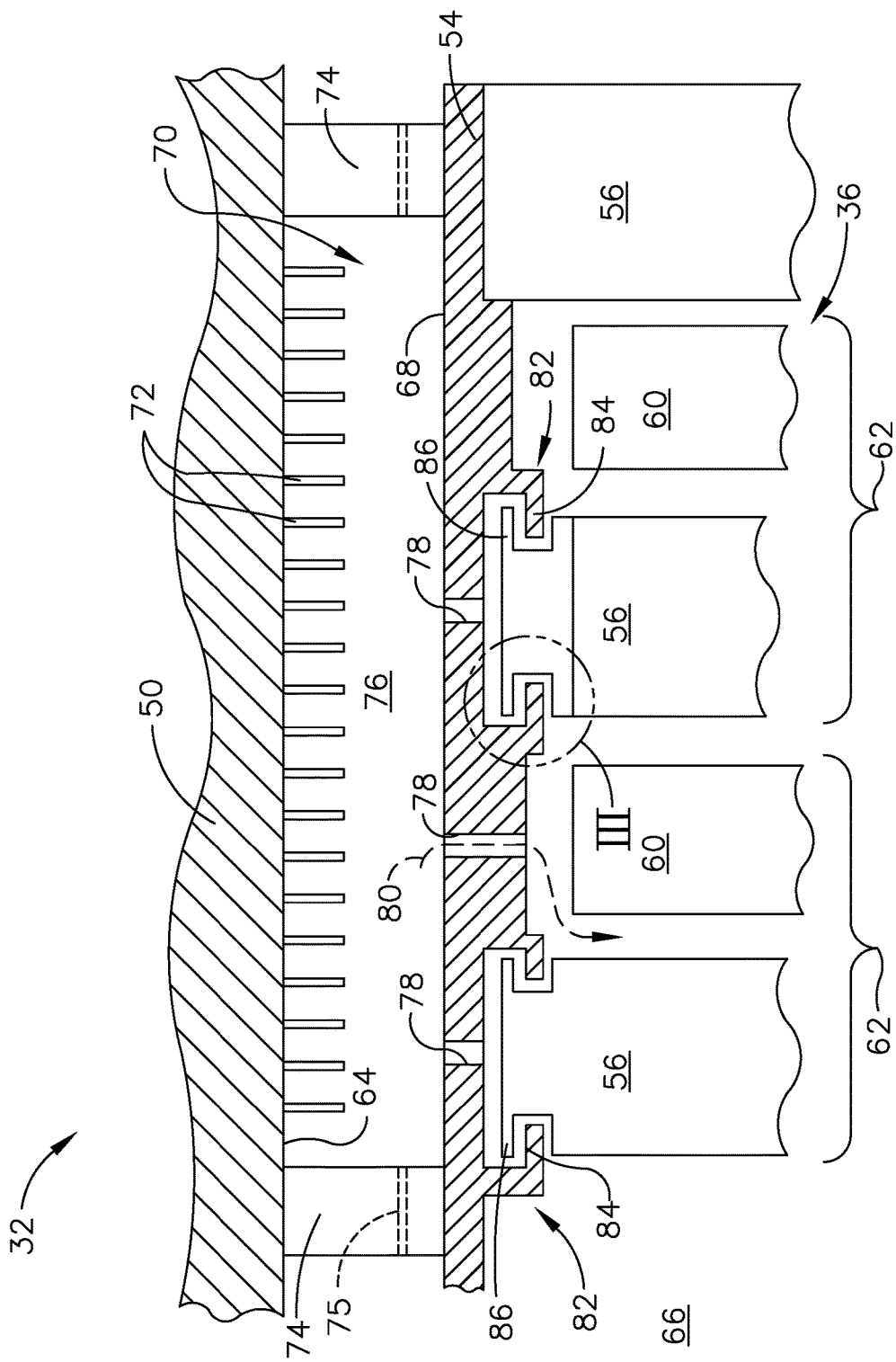
FIG. 2 is an enlarged schematic of a portion of the counter rotating low pressure turbine from FIG. 1 including a hanger assembly and flow passage according to an aspect of the disclosure herein.

FIG. 2 is an enlarged schematic view of a portion of the counter-rotating LP turbine 36 from FIG. 1. It can more clearly be seen that the outer casing 50 has a first surface 64 facing an interior 66 of the outer casing 50 and the outer drum 54 has a second surface 68 facing the first surface 64 to define an annular cavity 70 therebetween. A set of flow enhancers 72, illustrated as a set of fins extending from the first surface 64 can be provided within the annular cavity 70. The flow enhancers can also be, by way of non-limiting example, turbulators, pin fins, guide vanes, protrusions, or dimples. It is also contemplated that the flow enhancers are engineered roughness along the first surface 64. It is further contemplated that the flow enhancers can be provided on any surface and are not limited to the first surface as illustrated.

A set of seals 74, by way of non-limiting example a composite steel or nickel alloy ring, can be provided within the annular cavity 70 and define at least one cooled cavity 76 within the annular cavity 70. The at least one cooled cavity 76 can define an intermittently sealed cavity during rotation. More specifically, at any moment during operation, the at least one cooled cavity 76 can be completely or at least partially sealed shut by the set of seals 74. The set of seals 74 can include at least one cooling conduit 75 fluidly coupled to an area exterior of the cooled cavity 76. The at least one cooling conduit 75 can be intermittently spaced circumferentially about the outer drum 54 so as to define the intermittently sealed cavity during rotation. While illustrated as a single cooling conduit 75 in each of the seals illustrated, it should be appreciated that multiple cooling conduits 75 can be formed in the set of seals 74. It is contemplated that the set of seals 74 are annular such that they circumscribe the entire outer drum 54, or in other implementations are segmented seals partially circumscribing the outer drum 54. It is therefore contemplated that the at least one cooled cavity 76 formed by the set of seals 74 can also circumscribe the entire outer drum 54 or be located at varying points around the outer drum 54.

A set of flow passages 78 can be provided within the outer drum 54 and define an airflow passage 80 between the at least one cooled cavity 76 and the turbine section 32 within the interior 66 of the outer casing 50. By way of non-limiting example, the turbine section 32 is the counter-rotating LP turbine 36.

By way of non-limiting example the first set of blades 56 can be mounted to the outer drum 54 via at least one hanger assembly 82. It should be appreciated that the at least one hanger assembly 82 can be multiple hanger assemblies circumferentially and/or axially arranged. The at least one hanger assembly 82 can include a hook 84 extending from the outer drum 54 towards the interior 66. The first set of blades 56 can terminate in a flange 86 wherein the flange 86 is received within the hook 84 to secure the first set of blades 56 to the outer drum 54. It should be understood that the first set of blades 56 can be mounted to the outer drum 54 in any suitable way and that the at least one hanger assembly 82 is for illustrative purposes only and not meant to be limiting. It is contemplated that the at least one hanger assembly 82 can include an interference fit with slots in one of the hook 84 or flange 86.

Figure 3:
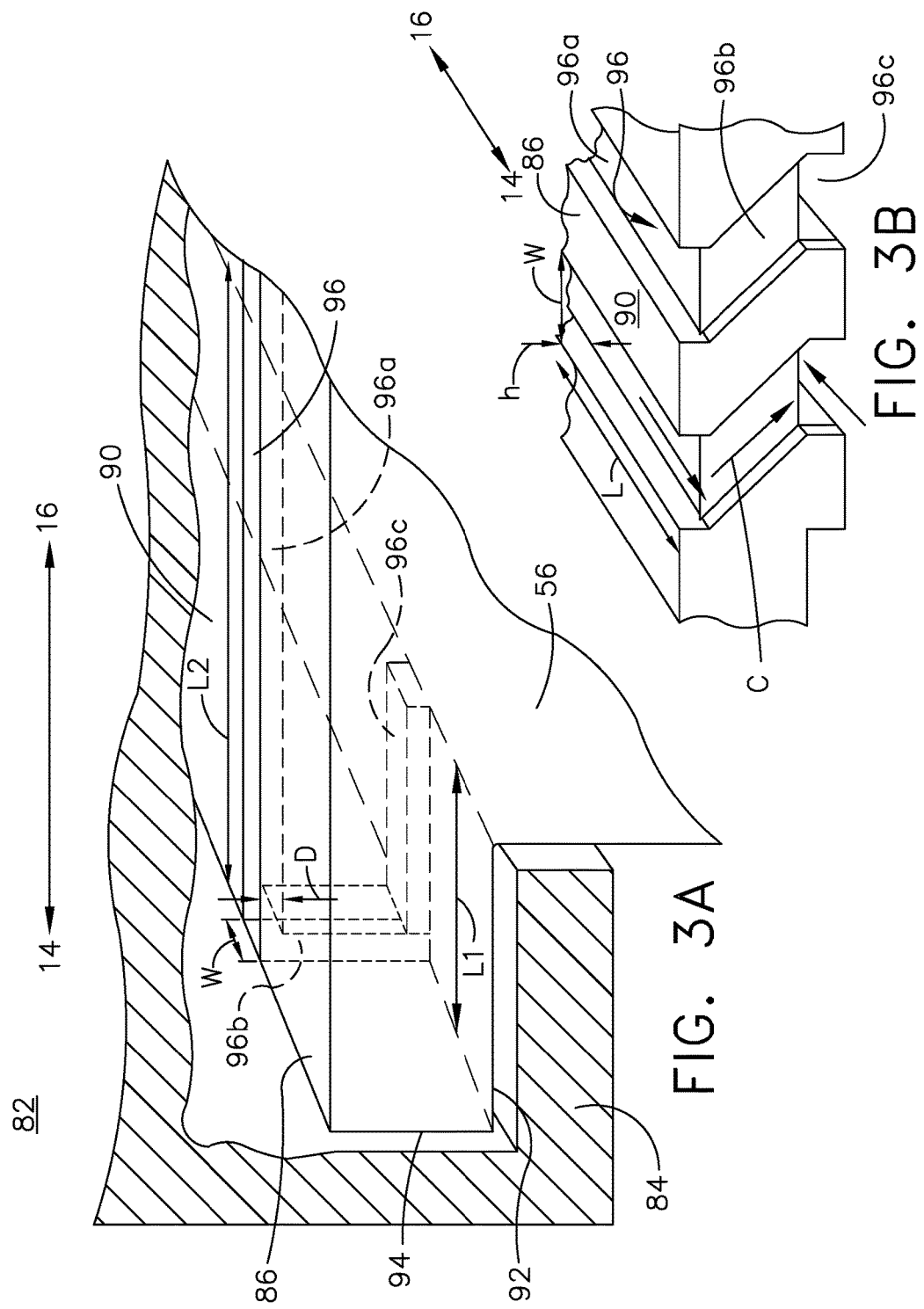
FIG. 3A is a first enlarged perspective view of the hanger assembly of FIG. 2 according to an aspect of the disclosure herein.
FIG. 3B is a second view of the hanger assembly for the low pressure turbine of FIG. 3A.

Turning to FIG. 3A, an enlarged portion III of FIG. 2 more clearly depicts the at least one hanger assembly 82. The flange 86 includes an upper and lower surface 90, 92 and terminates in an axial face 94. The flange 86 can extend out from the blade 56 a length (L1). A set of channels 96 can include an axial channel 96*a* extending axially some length (L2) along the upper surface 90. The set of channels 96 further defines a width (W) perpendicular to the length (L2) and a depth (D) extending into the flange 86. The length (L1) can be any suitable length corresponding to the flange 86 dimensions. The set of channels 96 can include a radial channel 96*b* extending radially along the axial face 94 of the flange 86 and a second axial channel 96*c* further extending along the lower surface 92 up to the length (L1). It is contemplated that the set of channels can have optimized dimensions (L1, L2, D, W) in terms of flow adherence, metering prevention and effective cooling. Optimization of the dimensions maximizes cooling effectiveness while minimizing cooling flow. The walls that form the at least one set of channels 96 can be straight or curved or angled in the circumferential direction. While only one continuous channel is portrayed as the set of channels, it should be understood that multiple channels can be formed in the at least one hanger assembly 82. It should be understood that multiple channels can be spaced equally apart or at different spacings not necessarily equally apart depending on the at least one hanger assembly 82. Though not illustrated as such, it is further contemplated that the set of channels is formed in the hook 84, the hook 84 and flange 86, or just the flange 86 as illustrated.

Turning to FIG. 3B, looking aft 16 at the flange 86, in another aspect of the disclosure discussed herein it is further contemplated that the radially extending portion 96*b* of the set of channels 96 can be angled with respect to the radial direction. In other words the radially extending portion 96*b* can have a circumferential component and provide more surface area for cooling. It is further contemplated that the channels 96*a*, 96*c* can also be angled with respect to the axial direction. Cooling fluid (C) such as air can flow through the set of channels 96 in a forward 14 to aft 16 direction (or vice versa depending on flange orientation) and radially along the radially extending portion 96*b* as illustrated.

Figure 4:
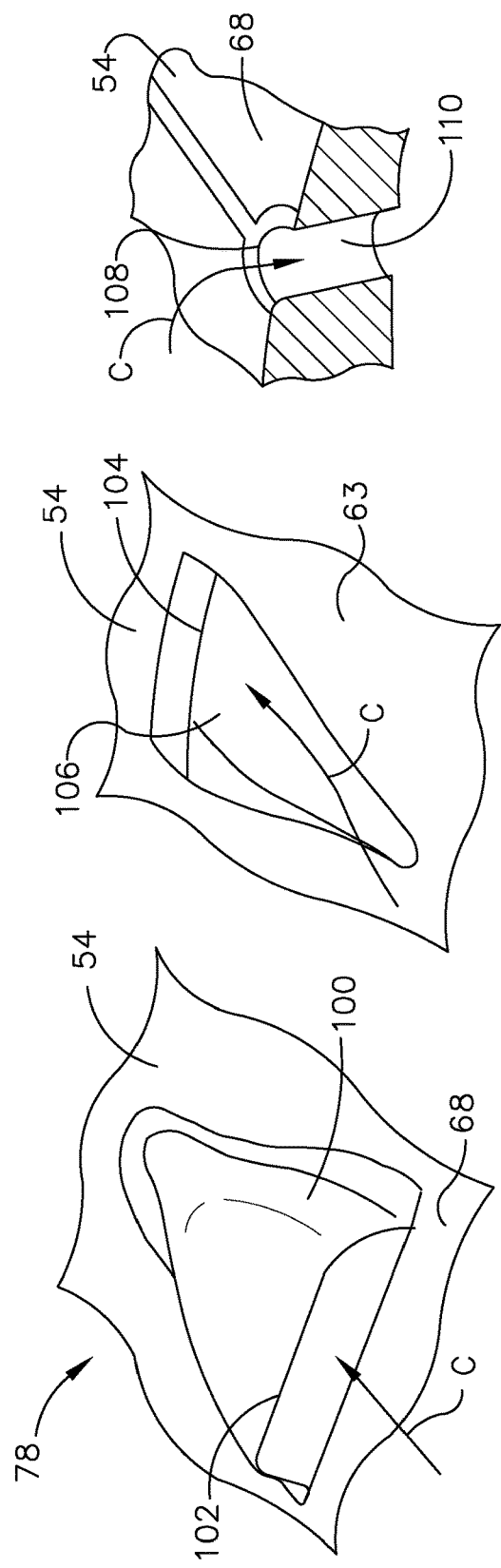
FIG. 4A is a perspective view of a scoop for the flow passage of FIG. 2 according to an aspect of the disclosure herein.
FIG. 4B is a perspective view of a duct for the flow passage of FIG. 2 according to another aspect of the disclosure herein.
FIG. 4C is a perspective view of a through hole for the flow passage of FIG. 2 according to yet another aspect of the disclosure herein.

FIG. 4A is an enlarged view of the flow passage 78 according to an aspect of the disclosure discussed herein. The flow passage 78 can include a scoop 100 in which a hood 102 extends from the second surface 68 of the outer drum 54. The scoop 100 enables high capture of cooling fluid (C) within the annular cavity 70.

FIG. 4B is an enlarged view of the flow passage 78 according to another aspect of the disclosure discussed herein. The flow passage 78 can include a duct 104 in which a ramped portion 106 extends into the second surface 68 of the outer drum 54. The duct 104 enables a lesser air capture when compared to the scoop 100, but can enable a low induced drag when compared to the scoop 100. It should be understood that either feature, the scoop 100 or the duct 104, could be designed and optimized with respect to size and location to deliver the required flow at the lowest drag while maintaining the required mechanical strength of the outer drum 54.

FIG. 4C is an enlarged view of the flow passage 78 according to yet another aspect of the disclosure discussed herein. The flow passage 78 can embody a through hole 108 in which a connecting passage 110 extends through the outer drum 54 from the second surface 68 to the interior 66. It is further contemplated that the connecting passage 110 can be serpentine passages that curve through the outer drum 54 to increase cooling within the outer drum 54. The through hole 108 provides low induced drag along with no dynamic head capture when compared to the scoop 100 or the duct 104. The through-hole 108 provides mechanical advantages when compared to the scoop 100 and duct 104. The through-hole 108 requires the lowest cooling fluid flow (C) for the same characteristic size as the scoop 100 or duct 104.

Figure 5:
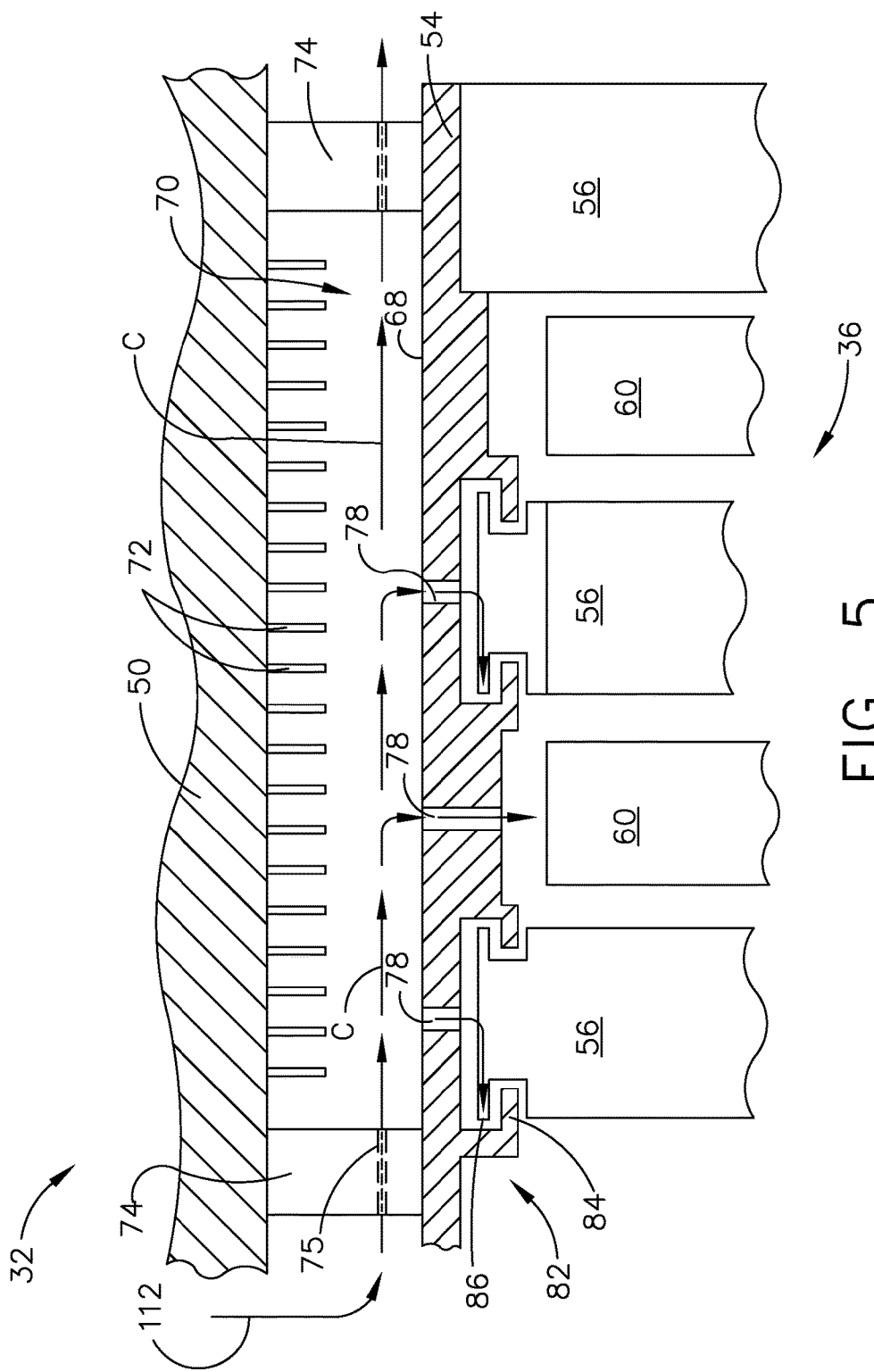
FIG. 5 is the same illustration as FIG. 2 showing a cooling fluid flow in the low pressure turbine from FIG. 1 according to an aspect of the disclosure herein.

Flowing a cooling fluid (C) within the turbine section 32 is more clearly illustrated in FIG. 5. A method for cooling the annular cavity 70 of turbine engine 10 includes introducing the cooling fluid (C) into the annular cavity 70 from, by way of non-limiting example, the compressor section 22. Cooling fluid (C) can be bleed air 112 directed to the turbine section 32 for cooling the annular cavity 70. The cooling fluid (C) can flow into the at least one cooled cavity 76 by way of non-limiting example through the at least one cooling conduit 75 located within the set of seals 74. The method can further include flowing the cooling fluid (C) through at least one cooling conduit 75 formed in the seal 74, by way of non-limiting example to enter or exit via the cooled cavity 76. The method further includes flowing at least a portion of the cooling fluid (C) through the set of flow passages 78 in the outer drum 54.

The method as described herein can further include introducing a further portion of the cooling fluid (C) to the at least one set of channels 96 located within the flange 86 and illustrated in FIG. 3B.

Figure 6:
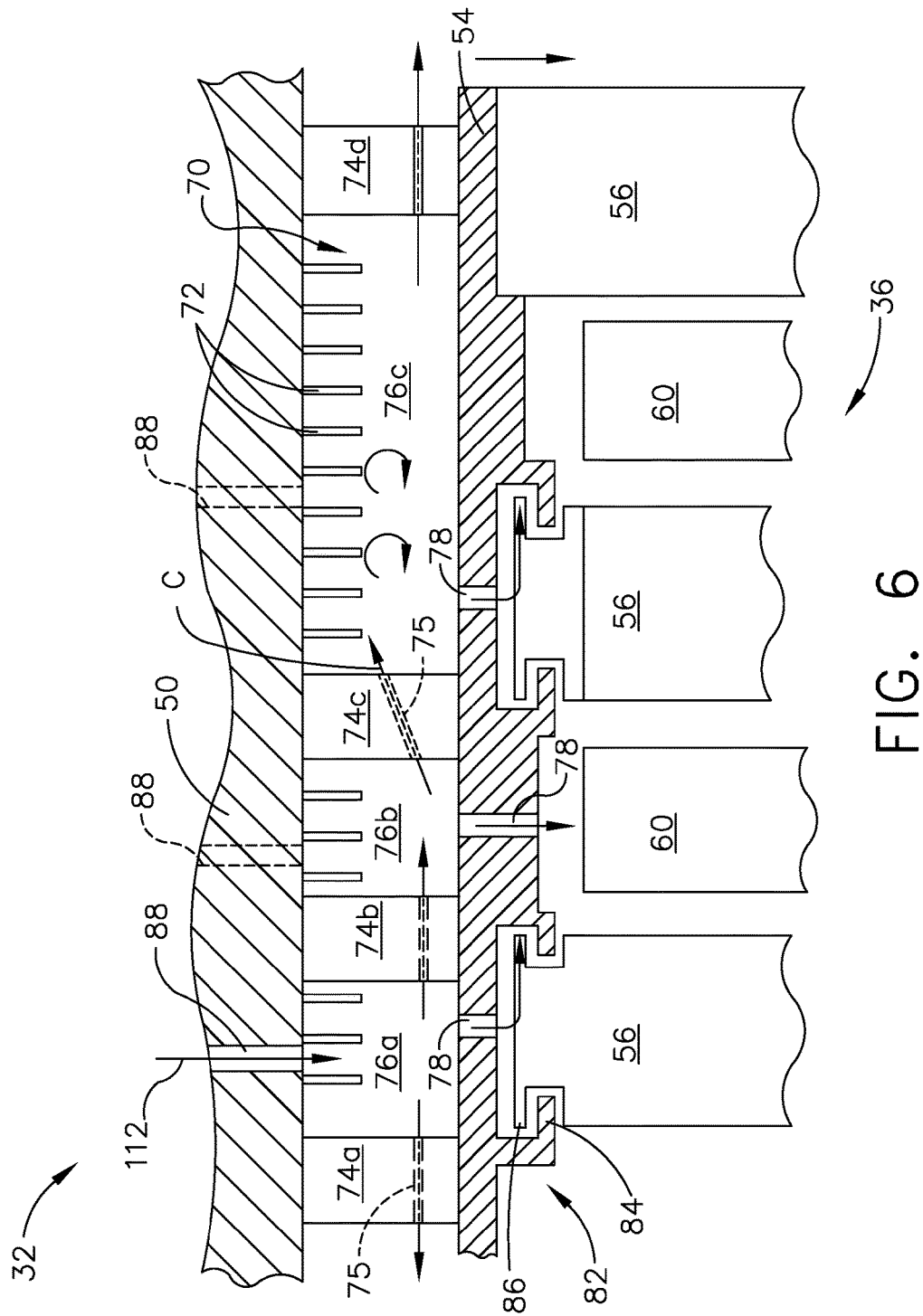
FIG. 6 is an enlarged schematic of a portion of the counter rotating low pressure turbine from FIG. 1 including a hanger assembly and flow passage according to another aspect of the disclosure herein.

Turning to FIG. 6, in another aspect of the disclosure discussed herein it is further contemplated that the set of seals 74 includes multiple seals 74*a*, 74*b*, 74*c*, 74*d*, forming multiple sealed cavities 76*a*, 76*b*, 76*c*. The sealed cavities 76*a*, 76*b* can be similar in terms of size and dimension or differ, as cooled cavity 76*c* is illustrated as having a longer axial dimension. It is also contemplated that the at least one cooling conduit 75 formed in the set of seals 74 can be angled as depicted in seal 74*c*. In some aspects of the disclosure discussed herein, the angle may be oriented such that cooling fluid (C) exits the cooling conduit 75 in direct contact with the set of flow enhancers 72.

The method as discussed herein can therefore further include flowing the cooling fluid (C) through multiple sealed cavities 76*a*, 76*b*, and 76*c*. Furthermore, cooling fluid (C) can exit the at least one cooling conduit 75 such that some of the cooling fluid (C) contacts the set of flow enhancers 72 and in response is swirled to more effectively cool the annular cavity 70.

It is also contemplated that cooling fluid (C), which can be bleed air 112, is introduced to the annular cavity 70 via a connecting conduit 88 in the core casing 50. Connecting conduit 88 can be located anywhere in the core casing 50, by way of non-limiting example the connecting conduit 88 fluidly connects the cooled cavity 76a to a supply of cooling fluid (C) exterior of the core casing 50. It is further contemplated that the connecting conduit 88 can be multiple connecting conduits 88, illustrated in phantom, fluidly connecting sealed cavities 76b, 76c to a supply of cooling fluid (C) exterior of the core casing 50. The conduits can be spaced apart axially or circumferentially around the outer case 50, or in any combination thereof as described herein.

It should be further understood that when the outer drum 54 is rotating, the flow passages are also rotating and therefore where the cooling fluid (C) is introduced is continuously changing. This enables a control in terms of locations that the cooling fluid (C) is introduced to and the rate and time at which the cooling fluid is received.

It should be understood that any combination of the geometry related to the orientation of aspects disclosure herein is contemplated. The varying aspects of the disclosure discussed herein are for illustrative purposes and not meant to be limiting.

Benefits associated with aspects of the disclosure herein include optimization with respect to the annular cavity discussed herein. The cooling as discussed can occur in different areas of the counter rotating LP turbine including the outer drum and hanger assembly. Furthermore cooling fluid and the passage thereof is controlled by rotating the holes and the location and orientation of the set of seals, at least one cooling conduit, at least one connecting passage, the set of flow enhancers, and the set of flow passages. While cooling as discussed herein is optimal for a counter rotating turbine, it can also be implemented in other types of turbine engines.

The orientation and application of the set of seals and controlled flow of cooling fluid helps with windage reduction in the LP turbine. The relative temperature in the annular cavity with respect to the rotor is also reduced.

Forming and optimizing the location of sealed cavities within the annular cavity can reduce convection between the outer drum and inner drum. Managing seal locations and dimensions of the sealed cavities as discussed herein can reduce the pressure differences across each seal which in turn can reduce leakage. Compartmentalizing the annular cavity as discussed herein reduces cooling flows, stabilizes pressure differences. Providing flow enhancers enhances heat loss along the outer case.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   an outer casing having a first surface facing an interior of the outer casing and defining an axial centerline;
   an engine core provided within the interior of the outer casing and having a first set of blades and a second set of blades axially spaced from the first set of blades, both sets circumferentially arranged about the axial centerline, and through which gasses flow in a forward to aft direction;
   an outer drum located within the outer casing and having a second surface spaced from the first surface to define an annular cavity between the first and second surfaces;
   a set of seals extending between the first surface and the second surface to define at least one cooled cavity within the annular cavity; and
   a set of flow passages provided in the outer drum and fluidly coupling the at least one cooled cavity to the interior.

2. The turbine engine of claim 1 wherein the first set of blades is mounted to the outer drum rotatable about the axial centerline and the second set of blades is mounted to a counter rotating inner drum rotatable about the axial centerline in an opposite direction of the outer drum and the first and the second set of blades are in one of a counter-rotating turbine section or a counter-rotating compressor section.

3. The turbine engine of claim 1 wherein the first set of blades is mounted to the outer drum via a hanger assembly.

4. The turbine engine of claim 3 wherein the hanger assembly includes a set of channels.

5. The turbine engine of claim 4 wherein the hanger assembly comprises a hook and flange and the set of channels is located in the flange.

6. The turbine engine of claim 4 wherein the set of channels includes at least one of an axial channel extending in an axial direction with respect to the axial centerline or a radial channel extending in a radial direction with respect to the axial centerline.

7. The turbine engine of claim 6 wherein the set of channels includes the axial channel and the radial channel.

8. The turbine engine of claim 7 wherein at least one of the axial or radial channels is angled with respect to the axial or radial direction.

9. The turbine engine of claim 8 wherein the radial channel is angled with respect to the radial direction.

10. The turbine engine of claim 1 wherein a set of flow enhancers is located within the annular cavity.

11. The turbine engine of claim 10 wherein the set of flow enhancers is a set of fins, dimples, protrusions, guide vanes, or engineered roughness.

12. The turbine engine of claim 1 wherein the set of flow passages is any one of a scoop, a duct, or a through hole.

13. The turbine engine of claim 1 wherein the outer casing and the outer drum are annular about the axial centerline.

14. The turbine engine of claim 1 wherein the first set of blades is a set of circumferentially arranged static vanes.

15. A turbine engine comprising:
    an outer casing having a first surface facing an interior of the outer casing and defining an axial centerline;
    a turbine section provided within the interior of the outer casing and having counter rotatable inner and outer drums each including a set of blades extending therefrom and rotatable about the axial centerline through which a flow of combustion gasses flows in a forward to aft direction, the outer drum defining a second surface spaced from the first surface to define an annular cavity between the first and second surfaces;
    a set of seals extending between the first surface and the second surface to define at least one cooled cavity within the annular cavity; and a set of flow passages provided in the outer drum and fluidly coupling the at least one cooled cavity to the turbine section.

16. The turbine engine of claim 15 wherein a first set of blades extends radially inward from the outer drum and is mounted to the outer drum via a hanger assembly.

17. The turbine engine of claim 16 wherein the hanger assembly includes a set of channels.

18. The turbine engine of claim 17 wherein the hanger assembly comprises a hook and flange and the set of channels is located in the flange.

19. The turbine engine of claim 17 wherein the set of channels includes an axial channel extending in the axial direction with respect to an axial centerline and a radial channel extending in a radial direction with respect to the axial centerline.

20. The turbine engine of claim 19 wherein at least one of the axial or radial channels is angled with respect to the axial or radial direction.

21. The turbine engine of claim 20 wherein the radial channel is angled with respect to the radial direction.

22. The turbine engine of claim 15 wherein a set of flow enhancers is located within the annular cavity.

23. The turbine engine of claim 15 wherein the set of flow passages is any one of a scoop, a duct, or a through hole.

24. The turbine engine of claim 15 wherein the turbine section is a low pressure turbine.

25. A method for cooling an annular cavity of a turbine engine having an outer casing and an outer drum with the annular cavity formed therebetween, the method comprising:
introducing a cooling fluid into the annular cavity;
flowing the cooling fluid through at least one cooled cavity located within the annular cavity; and,
flowing at least a portion of the cooling fluid through a flow passage in the outer drum.

26. The method of claim 25 further comprising introducing at least a portion of the cooling fluid to a set of channels located within a flange extending from a blade.

27. The method of claim 25 further comprising flowing the cooling fluid through multiple sealed cavities.

28. The method of claim 25 further comprising flowing the cooling fluid through at least one cooling conduit formed in a seal of the at least one cooled cavity.

29. The method of claim 25 further comprising introducing the cooling fluid to the at least one cooled cavity through at least one connecting conduit formed in the outer casing.

30. The method of claim 25 further comprising swirling the cooling fluid around flow enhancers extending from the outer casing.

* * * * *